United States Patent [19]  [11]  4,139,697
Sidi  [45]  Feb. 13, 1979

[54] COLOR STABILIZATION OF VINYL CHLORIDE RESINS

[75] Inventor: Henri Sidi, Paramus, N.J.

[73] Assignee: Tenneco Chemicals, Inc., Saddle Brook, N.J.

[21] Appl. No.: 784,998

[22] Filed: Apr. 6, 1977

[51] Int. Cl.$^2$ .............................................. C08F 6/24
[52] U.S. Cl. ...................................... 528/492; 526/51; 526/57; 528/486; 528/487; 528/491; 528/494
[58] Field of Search ........................ 526/51, 57, 30, 55, 526/56, 344; 528/491, 492

[56] References Cited

U.S. PATENT DOCUMENTS

| | | | |
|---|---|---|---|
| 2,432,448 | 12/1947 | Richards | 526/57 |
| 3,077,371 | 2/1963 | Schoeneberg | 8/111 |
| 3,397,033 | 8/1968 | Ney | 8/111 |
| 3,600,366 | 8/1971 | Heckert | 528/488 X |
| 3,697,495 | 10/1972 | Bristol | 526/58 X |
| 3,892,719 | 7/1975 | Matsumura | 260/79.3 MU |

Primary Examiner—C. A. Henderson
Attorney, Agent, or Firm—Evelyn Berlow

[57] ABSTRACT

The discoloration that vinyl chloride resins usually undergo when a slurry containing one of these resins is heated at a temperature above 70° C. to reduce its monomer content to less than 10 ppm is minimized or prevented by carrying out the heating step in the presence of a monomer-miscible color stabilizer that comprises an organic peroxide and/or an organic azo compound.

13 Claims, No Drawings

COLOR STABILIZATION OF VINYL CHLORIDE RESINS

This invention relates to a process for the color stabilization of vinyl chloride resins. More particularly, it relates to a procedure for minimizing or preventing discoloration of the resins during the removal of residual vinyl chloride from slurries of vinyl chloride homopolymers or copolymers by heating at temperatures above 70° C.

When vinyl chloride or a mixture of vinyl chloride and a comonomer is polymerized in an aqueous medium by suspension or emulsion polymerization techniques, there is obtained a slurry that contains from 5% to 50% by weight of vinyl chloride resin and up to 5% by weight of residual vinyl chloride. Most of the unreacted monomer is usually removed by heating the slurry under vacuum to about 65° C. As it is ordinarily practiced, this stripping procedure reduces the monomer content of the slurry to about 100 ppm to 20,000 ppm. Further processing yields dry products that may contain 100 ppm or more monomer.

In view of the recently-developed safety standards that require that the amount of vinyl chloride in vinyl chloride resins and in the atmosphere be maintained at very low levels, it is necessary that the monomer content of vinyl chloride resin slurries be sufficiently reduced so that these requirements can be met.

Among the most effective procedures that have been developed for the removal of residual monomer from vinyl chloride resin slurries are those that involve heating the slurries at temperatures above 70° C. until the unreacted monomer has been removed. One such process is disclosed in copending application Ser. No. 482,112, which was filed by Feldman et al. on June 24, 1974 and which is incorporated herein by reference. In the process disclosed in Ser. No. 482,112, a vinyl chloride resin slurry or latex that contains from 100 ppm to 15,000 ppm by weight of vinyl chloride is heated at 70° C. to 125° C. and the evolved vinyl chloride vapor is removed until the slurry or latex contains less than 50 ppm and preferably less than 10 ppm of monomer. While this heat treatment effectively removes vinyl chloride from the slurry or latex, it often causes some deterioration of the resin as is evidenced by its development of color. Although the slight decomposition that the resin undergoes during heating to reduce its monomer content does not detract to any appreciable extent from its physical and mechanical properties, the discoloration seriously restricts its use in many applications.

In copending patent application Ser. No. 690,202, which was filed on May 25, 1976, Feldman disclosed a process in which the discoloration that vinyl chloride resins undergo when slurries containing them are heated at temperatures above 70° C. for a sufficient time to reduce their monomer content to the required very low levels can be reduced by carrying out the heating step in the presence of a water-soluble oxidizing agent, such as oxygen, hydrogen peroxide, sodium perborate, and potassium persulfate.

It has now been found that the discoloration of vinyl chloride resins that usually occurs when slurries containing the resins are heated at a temperature above 70° C. until their monomer content has been reduced to less than 10 ppm can be minimized or eliminated by carrying out the heating step in the presence of a monomer-miscible color stabilizer that comprises an organic peroxide and/or an organic azo compound. This treatment results in the recovery of a lighter, brighter resin.

In the process of this invention, a slurry that contains from 5% to 50% by weight of a vinyl chloride homopolymer or copolymer and from 100 ppm to 15,000 ppm of vinyl chloride is heated at a temperature between 70° C. and 100° C. in the presence of a monomer-miscible color stabilizer, and the evolved vinyl chloride is removed until the slurry contains less than 10 ppm and preferably less than 1 ppm of vinyl chloride. The treated slurry is then further processed to yield a vinyl chloride resin that contains less than 10 ppm and in most cases less than 1 ppm of vinyl chloride.

The color stabilizers that are used in the process of this invention comprise organic peroxides and organic azo compounds that are miscible with vinyl chloride and that do not impart color or odor to the slurries or to the vinyl chloride resins in the slurries. Because these organic peroxides and organic azo compounds undergo homolytic fission on heating, they are widely used as free-radical-generating initiators in the suspension and emulsion processes for the polymerization of ethylenically-unsaturated monomers.

The organic peroxides that can be used as the color stabilizer in the process of this invention have the structural formula

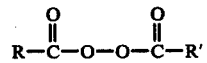

wherein R and R' each represents an alkyl group having 2 to 12 carbon atoms, a haloalkyl group having 2 to 12 carbon atoms, an aryl group having 6 to 10 carbon atoms, or a haloaryl group having 6 to 10 carbon atoms. Examples of these organic peroxides are diacetyl peroxide, dipropionyl peroxide, di-n-butyryl peroxide, diisobutyryl peroxide, diisovaleryl peroxide, bis-(2-ethylhexanoyl)peroxide, dipelargonyl peroxide, dilauroyl peroxide, bis(3,5,5-trimethylhexanoyl)peroxide, acetyl pelargonyl peroxide, chloroacetyl chlorocaproyl peroxide, caproyl lauroyl peroxide, bis(2-chlorolauroyl)peroxide, 2-chlorolauroyl lauroyl peroxide, 2-ethylhexanoyl 2-bromolauroyl peroxide, bis-(2-bromopelargonyl) peroxide, dibenzoyl peroxide, bis(o-methoxybenzoyl)peroxide, bis(o-methylbenzoyl)peroxide, bis(tert.butylbenzoyl)peroxide, bis(2-chloro-4-tert.butylbenzoyl)peroxide, bis(2,4-dibromobenzoyl) peroxide, bis(2,4,6-trichlorobenzoyl)peroxide, acetyl benzoyl peroxide, butyryl 2,4-dichlorobenzoyl peroxide, lauroyl benzoyl peroxide, benzoyl o-chlorobenzoyl peroxide, 2-chlorolauroyl o-methylbenzoyl peroxide, and mixtures thereof.

The organic azo compounds that are useful as color stabilizers in the process of this invention have the structural formula

wherein R" and R'" represent aliphatic hydrocarbon groups having 1 to 18 carbon atoms or cycloaliphatic hydrocarbon groups having 3 to 18 carbon atoms. The hydrocarbon groups may contain such conventional substituents as nitrile groups, ester groups, ether groups, carboxyl groups, thioether groups, or halogen atoms. R" and R'" may represent the same hydrocarbon or substituted hydrocarbon group or different groups. The organic azo compound is preferably an azo bis alkyl compound; that is, a compound having the aforementioned structure wherein R" and R''' each represents an alkyl group having 2 to 8 carbon atoms or a substituted alkyl group having 2 to 8 carbon atoms. Especially good results have been obtained in the process by using as the color stabilizer an azo bis(alkylnitrile). Examples of the organic azo compounds that can be used in the process of this invention include 2-cyano-2-propyl-azoformamide, 2,2'-azo-bis-isobutyronitrile, 2-(tert.butylazo)isobutyronitrile, 2-tert.butyl-azo-2-thiocyanate-propane, 1,1'-azo-bis-1-cyclobutanenitrile, 2,2'-azobis(2-methylbutyronitrile), 4-tert.butylazocyanovaleric acid), 4,4'-azo-bis(4-cyanopentanoic acid), 1,1'-azo-bis(1-cyclopentane nitrile) 2,2'-azo-bis(2-cyclopropyl-propionitrile), 2,2'-azo-bis-(2,3-dimethylbutyronitrile), 2,2'-azo-bis(2-methylvaleronitrile), 2,2'-azobis(2-isopropyl-3-methylbutyronitrile), 1,1'-azo-bis(1-cyclohexanenitrile), 2,2'-azo-bis-(2,3,3-trimethylbutyronitrile), 2,2'-azo-bis(2-methylhexylnitrile), 2,2'-azo-bis-(2,4-dimethylvaleronitrile), 2,2'-azo-bis(2-isopropylvaleronitrile), 2,2'-azobis-(2-cyclopentylpropionitrile), 2,2'-azo-bis(2-isopropyl-3-methylvaleronitrile), 1,1'-azo-bis(1-cyclooctanenitrile), 2,2'-azo-bis-(2-isobutyl-4-methylvaleronitrile), tert.butylazoformamide, azo-bis-isobutyramidine, 2,2'-azo-bis(methyl-2-methylpropionate), 2-tert.butyl-azo-2,4-dimethylpentane, 1-tert.butylazo-1-methoxycyclohexane, azo-bis(1-carbomethoxy-3-methylpropane), 2,2'-azobis-(2-cyclopropylpropionamide), 2,2'-azodiisobutyrate, dimethyl-2,2'-azodiisobutyrate, and 2,2'-azobis(2,3-dimethyl-3-methoxyvaleronitrile).

The color stabilizer may be an organic peroxide, an organic azo compound, a mixture of organic peroxides, a mixture of organic azo compounds, or a mixture of at least one organic peroxide and at least one organic azo compound. Alternatively, it may be a mixture of at least one organic peroxide and/or organic azo compound with a vicinal epoxide having 2 to 8 carbon atoms, such as ethylene oxide, propylene oxide, butylene oxide, epichlorohydrin, epoxyethylbenzene, allyl glycidyl ether, vinyl cyclohexene oxide, glycide, styrene oxide, glycidyl acrylate, or glycidyl methacrylate.

The amount of the color stabilizer used is that which will prevent discoloration of the vinyl chloride resin when a slurry that contains the resin is heated at a temperature above 70° C. for a time sufficient to reduce its vinyl chloride content to less than 10 ppm without causing foaming or other handling problems. It is dependent upon such factors as the temperature at which the slurry is heated, the length of the heating period, and the monomer content of the slurry. In most cases, 0.2 part to 5 parts by weight of the color stabilizer per 100 parts by weight of vinyl chloride resin in the slurry will prevent discoloration of the resin during the heating treatment. Larger amounts of the color stabilizer can be used, but they generally do not provide additional improvement in the color of the product. Particularly advantageous results have been obtained when the slurry was heated in the presence of from 0.3 part to 3 parts by weight of the color stabilizer per 100 parts by weight of vinyl chloride resin. The color stabilizer or a solution of the color stabilizer in a carrier solvent, such as vinyl acetate, may be added to the slurry that contains the vinyl chloride resin before the heating of the slurry is begun, or it may be added either portionwise or continuously during the heating period.

As used herein, the term "vinyl chloride resin" includes both the high molecular weight homopolymers of vinyl chloride and the high molecular weight copolymers formed by the copolymerization of vinyl chloride with an essentially water-insoluble ethylenically-unsaturated monomer that is copolymerizable therewith. Suitable comonomers include vinyl acetate, vinyl propionate, vinyl butyrate, vinyl stearate, vinyl benzoate, ethylene, propylene, ethyl acrylate, acrylic acid, acrylamide, acrylonitrile, methacrylonitrile, vinylidene chloride, dialkyl fumarates and maleates, vinyl ethers, and the like. When one or more of these comonomers are used, the monomer component contains at least 70% and preferably 80% to 90% of vinyl chloride.

The vinyl chloride resin slurries that are treated in accordance with the process of this invention to prevent discoloration of the polymer during processing to remove residual vinyl chloride from them may be prepared by the well-known suspension or emulsion polymerization processes. In the suspension polymerization processes, the monomer is suspended in water by a suspending agent and agitation. The polymerization is initiated with a free-radical-generating polymerization initiator, such as dilauroyl peroxide, dibenzoyl peroxide, diisopropyl peroxydicarbonate, di-2-ethylhexyl peroxydicarbonate, tertiary butyl peroxypivalate, azobisisobutyronitrile, azobis-2,4-dimethylvaleronitrile, and mixtures thereof. Suspending agents that may be used include methylcellulose, hydroxymethylcellulose, hydroxyethylcellulose, hydrolyzed polyvinyl acetate, gelatin, methyl vinyl ether-maleic anhydride copolymers, and the like. In emulsion polymerization processes, the polymerization initiator may be hydrogen peroxide, an organic peroxide, a persulfate, or a redox system. Surface-active agents, such as alkyl sulfates, alkane sulfonates, alkyl aryl sulfonates, and fatty acid soaps are used as emulsifiers in these processes. The reaction mixtures produced by these processes are usually heated under vacuum to about 60° C. to 65° C. to remove most of the unreacted monomer from them. The resulting stripped slurries generally contain 5% to 50% and preferably 15% to 40% by weight of vinyl chloride resin as particles that range in size from about 5 microns to 200 microns and from about 100 ppm to 15,000 ppm of vinyl chloride. Following the removal of vinyl chloride from them by the process of this invention, the slurries may be dewatered, for example, on a rotary drum filter, and then dried, or they may be spray dried. The vinyl chloride resins prepared in this way have excellent brightness and color and usually contain less than 1 ppm of vinyl chloride.

The invention is further illustrated by the following examples. In these examples, all parts are parts by weight and all percentages are percentages by weight.

EXAMPLE 1

A. An aqueous slurry of a vinyl chloride-vinyl acetate copolymer was prepared by heating in an autoclave at 65° C. for 18 hours a polymerization system that contained 85 parts of vinyl chloride, 15 parts of vinyl acetate, 185 parts of deionized water, 0.125 part of dilauroyl peroxide, 1.75 parts of gelatin, and 0.69 part of trichloroethylene. The slurry was heated under vacuum at a temperature below 65° C. to reduce its vinyl chloride content to less than 5000 ppm.

B. Sixteen hundred grams of the slurry, which contained 32.5% of the vinyl chloride/vinyl acetate copolymer, was charged together with 2 grams of dilauroyl peroxide into a 2000-ml. reaction flask that was equipped with a thermometer, a stirrer, a condenser, and a nitrogen inlet tube. The reaction flask was immersed in a water bath. The slurry was stirred and gradually heated to 70°–75° C. while nitrogen was passed over its surface at the rate of about 0.5 cubic feet per hour. A 100 ml. sample of the slurry was taken when the treated slurry reacted 70°–75° C. and additional 100 ml. samples were taken at hourly intervals. The samples were filtered, and the wet solids were dried for 12 hours at 40°–45° C. in a forced air drying oven and then crushed. The copolymer obtained by drying the final sample contained less than 1 ppm of vinyl chloride.

The colors of the initial sample and the final sample of the dry, crushed copolymer were measured by reflectance using a Hunter Color Meter, Model D-25, which gives readings directly from the polymer surface. The results obtained are given in Table I. In this table, the L value relates to the brightness of the polymer, that is, to the percentage of the light that is reflected, with a perfectly white polymer having an L value of 100. The a and b values relate to hue. Positive a denotes red, negative a denotes green, positive b denotes yellow, and negative b denotes blue.

EXAMPLE 2

The procedure described in Example 1B was repeated except that instead of dilauroyl peroxide dibenzoyl peroxide was used as the color stabilizer. The copolymer obtained by drying the final sample contained less than 1 ppm of vinyl chloride. The colors of the initial and final samples of the dry, crushed copolymer, as measured by reflectance, are given in Table I.

EXAMPLE 3

The procedure described in Example 1B was repeated except that the slurry that contained dilauroyl peroxide was heated at 90°–92° C. for one hour. The copolymer obtained by drying the final sample contained less than 1 ppm of vinyl chloride. The colors of the initial and final samples of the dry, crushed copolymer, as measured by reflectance, are given in Table I.

EXAMPLE 4

The procedure described in Example 3 was repeated except that instead of dilauroyl peroxide dibenzoyl peroxide was used as the color stabilizer. The copolymer obtained by drying the final sample contained less than 1 ppm of vinyl chloride. The colors of the initial and final samples of the dry, crushed copolymer, as measured by reflectance, are given in Table I.

EXAMPLE 5

The procedure described in Example 3 was repeated except that instead of dilauroyl peroxide 2,2'-azo-bis-(2,4-dimethylvaleronitrile) (Vazo 52) was used as the color stabilizer. The copolymer obtained by drying the final sample contained less than 1 ppm of vinyl chloride. The colors of the initial and final samples of the dry, crushed copolymer, as measured by reflectance, are given in Table I.

EXAMPLE 6

The procedure described in Example 3 was repeated except that instead of dilauroyl peroxide 2,2'-azo-bis-(2,4-dimethyl-4-methoxyvaleronitrile) (Vazo 33) was used as the color stabilizer. The copolymer obtained by drying the final sample contained less than 1 ppm of vinyl chloride. The colors of the initial and final samples of the dry, crushed copolymer, as measured by reflectance, are given in Table I.

COMPARATIVE EXAMPLE

The procedure described in Example 3 was repeated except that no color stabilizer was added to the slurry before it was heated to reduce its monomer content. The copolymer obtained by drying the final sample contained less than 1 ppm of vinyl chloride. The colors of the initial and final samples of the dry, crushed copolymer, as measured by reflectance, are given in Table I.

TABLE I

| Ex. No. | Color Stabilizer Added | Amount of Color Stabilizer Added (PHR) | Slurry Treatment | Reflectance of Vinyl Chloride/Vinyl Acetate Copolymers | | | | | |
|---|---|---|---|---|---|---|---|---|---|
| | | | | Initial Sample | | | Final Sample | | |
| | | | | L | a | b | L | a | b |
| 1 | Dilauroyl Peroxide | 0.35 | 3 Hrs. at 70° – 75° C. | 96.60 | +0.72 | +2.50 | 96.00 | +1.40 | +2.90 |
| 2 | Dibenzoyl Peroxide | 0.35 | 3 Hrs. at 70° – 75° C. | 97.60 | 0.00 | +2.40 | 98.00 | −0.20 | +2.85 |
| 3 | Dilauroyl Peroxide | 0.30 | 1 Hr. at 90° –92° C. | 96.80 | −0.10 | +2.65 | 95.50 | +1.20 | +5.65 |
| 4 | Dibenzoyl Peroxide | 0.35 | 1 Hr. at 90° –92° C. | 96.60 | +0.85 | +3.00 | 97.05 | −0.30 | +4.15 |
| 5 | 2,2'-Azobis(2,4-dimethylvaleronitrile) | 0.35 | 1 Hr. at 90° –92° C. | 96.65 | +0.85 | +3.10 | 95.95 | +1.10 | +4.75 |
| 6 | 2,2'-Azobis(2,4-dimethyl-4-methoxyvaleronitrile) | 0.30 | 1 Hr. at 90° –92° C. | 96.60 | +0.35 | +2.75 | 94.80 | +1.45 | +4.70 |
| Comp. Ex. | None | — | 1 Hr. at 90° –92° C. | 96.70 | +1.25 | +3.30 | 94.35 | +2.15 | +5.00 |

The data in Table I demonstrate that the addition of a monomer-miscible color stabilizer to a vinyl chloride/vinyl acetate copolymer slurry that is to be maintained at an elevated temperature until its monomer content has fallen below 1 ppm resulted in the recovery of a lighter-colored and brighter product than was obtained in the absence of a color stabilizer. Particularly bright products were obtained when the color stabilizer was dibenzoyl peroxide.

EXAMPLES 7–9

The procedure described in Example 1B was repeated except that other color stabilizers were used instead of dilauroyl peroxide. In each case, the copolymer that was obtained by drying the final sample contained less than 1 ppm of vinyl chloride. The color stabilizers and the amounts of each that were used and the results obtained are given in Table II.

TABLE II

| Ex. No. | Color Stabilizer Added | Amount of Color Stabilizer Added (PHR) | Slurry Treatment | Reflectance of Vinyl Chloride/Vinyl Acetate Copolymers | | | | | |
|---|---|---|---|---|---|---|---|---|---|
| | | | | Initial Sample | | | Final Sample | | |
| | | | | L | a | b | L | a | b |
| 7 | Dibenzoyl Peroxide | 0.33 | 1 Hr. at 90° – 92° C. | 96.70 | +0.70 | +3.00 | 97.35 | −0.45 | +4.10 |
| | Dilauroyl Peroxide | 0.33 | | | | | | | |
| 8 | Dibenzoyl Peroxide | 0.33 | 1 Hr. at 90° – 92° C. | 96.65 | +1.10 | +3.10 | 97.20 | −0.55 | +4.20 |
| | 2,2'-Azobis(2,4-dimethylvaleronitrile) | 0.33 | | | | | | | |
| 9 | Dibenzoyl Peroxide | 0.38 | 1 Hr. at 90° –92° C. | 96.60 | +0.65 | +2.85 | 97.65 | −0.20 | +3.40 |
| | Epichlorohydrin | 2.00 | | | | | | | |
| Comp. Ex. | None | — | 1 Hr. at 90° – 92° C. | 96.70 | +1.25 | +3.30 | 94.35 | +2.15 | +5.00 |

From the data in Table II, it will be seen that the use of color stabilizers that were mixtures of dibenzoyl peroxide with either another organic peroxide, an organic azo compound, or an epoxide resulted in products that were lighter-colored and brighter than that obtained in the absence of a color stabilizer.

What is claimed is:

1. In the process for the removal of vinyl chloride from an aqueous slurry that contains 5% to 50% by weight of a vinyl chloride resin and 100 ppm to 15,000 ppm of vinyl chloride wherein the slurry is heated at a temperature between 70° C. and 100° C. until it contains less than 10 ppm of vinyl chloride, the improvement wherein discoloration of the vinyl chloride resin is inhibited by contacting the vinyl chloride resin in the slurry during the heat treatment with a monomer-miscible color stabilizer selected from the group consisting of (a) organic peroxides having the structural formula

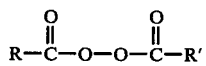

wherein R and R' each represents an alkyl group having 2 to 12 carbon atoms, a haloalkyl group having 2 to 12 carbon atoms, an aryl group having 6 to 10 carbon atoms, or a haloaryl group having 6 to 10 carbon atoms;

(b) an organic azo compound having the structural formula

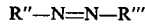

wherein R" and R'" each represents an aliphatic hydrocarbon group having 1 to 18 carbon atoms; a nitrile-substituted aliphatic hydrocarbon group having 1 to 18 carbon atoms; a cycloaliphatic hydrocarbon group having 3 to 18 carbon atoms; or a nitrile-substituted cycloaliphatic hydrocarbon group having 3 to 18 carbon atoms; and (c) mixtures thereof.

2. The process of claim 1 wherein the color stabilizer comprises an organic peroxide.

3. The process of claim 1 wherein the color stabilizer comprises dibenzoyl peroxide.

4. The process of claim 1 wherein the color stabilizer comprises dilauroyl peroxide.

5. The process of claim 1 wherein the color stabilizer comprises an azo bis(alkyl nitrile).

6. The process of claim 5 wherein the color stabilizer comprises 2,2'-azo bis(2,4-dimethylvaleronitrile).

7. The process of claim 5 wherein the color stabilizer comprises 2,2'-azo bis(2,4-dimethyl-4-methoxyvaleronitrile).

8. The process of claim 1 wherein the color stabilizer is a mixture of dibenzoyl peroxide and dilauroyl peroxide.

9. The process of claim 1 wherein the color stabilizer is a mixture of dibenzoyl peroxide and 2,2'-azo bis(2,4-dimethylvaleronitrile).

10. The process of claim 1 wherein 0.3 part to 3 parts by weight of the color stabilizer is added per 100 parts by weight of vinyl chloride resin in the slurry.

11. The process of claim 1 wherein the color stabilizer is added before the slurry is heated at 70° C. to 100° C.

12. The process of claim 1 wherein the vinyl chloride resin is a vinyl chloride/vinyl acetate copolymer.

13. The process of claim 1 wherein 0.2 part to 5 parts by weight of the color stabilizer is added per 100 parts by weight of vinyl chloride resin in the slurry.

* * * * *